United States Patent
Tohyama et al.

(10) Patent No.: US 8,458,897 B2
(45) Date of Patent: Jun. 11, 2013

(54) VEHICLE ASSEMBLY LINE

(75) Inventors: Shinji Tohyama, Toyota (JP); Koji Tomida, Okazaki (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 154 days.

(21) Appl. No.: 13/201,565

(22) PCT Filed: Feb. 12, 2010

(86) PCT No.: PCT/IB2010/000270
§ 371 (c)(1),
(2), (4) Date: Aug. 15, 2011

(87) PCT Pub. No.: WO2010/092463
PCT Pub. Date: Aug. 19, 2010

(65) Prior Publication Data
US 2011/0308075 A1  Dec. 22, 2011

(30) Foreign Application Priority Data

Feb. 16, 2009 (JP) .................................. 2009-033218

(51) Int. Cl.
*B23P 21/00* (2006.01)

(52) U.S. Cl.
USPC .................. 29/783; 29/784; 29/791; 29/824; 29/799

(58) Field of Classification Search
USPC .................... 29/431, 784, 783, 791, 824, 799
See application file for complete search history.

(56) References Cited

U.S. PATENT DOCUMENTS

| | | | | |
|---|---|---|---|---|
| 5,012,917 A | * | 5/1991 | Gilbert et al. | 198/465.2 |
| 5,234,096 A | | 8/1993 | Saruki et al. | |
| 6,494,142 B2 | * | 12/2002 | Masugaki et al. | 104/168 |
| 6,494,304 B1 | * | 12/2002 | Jaynes et al. | 198/345.2 |
| 7,153,078 B2 | * | 12/2006 | Beerhalter et al. | 414/400 |
| 2004/0007440 A1 | | 1/2004 | Doan | |
| 2004/0054435 A1 | * | 3/2004 | Dehne et al. | 700/213 |
| 2005/0188892 A1 | | 9/2005 | Ueno et al. | |

FOREIGN PATENT DOCUMENTS

| | | |
|---|---|---|
| DE | 905 349 C | 3/1954 |
| DE | 100 02 541 A1 | 7/2001 |
| DE | 102 61 337 A1 | 7/2004 |
| JP | 60-056682 A | 4/1985 |
| JP | 62-168767 A | 7/1987 |
| JP | 4-028620 A | 1/1992 |
| JP | 5-104359 A | 4/1993 |
| JP | 5-105138 A | 4/1993 |
| JP | 7-069244 A | 3/1995 |
| JP | 2002-114179 A | 4/2002 |
| JP | 2003-267278 A | 9/2003 |
| JP | 2005-239056 A | 9/2005 |
| JP | 2009-001182 A | 1/2009 |

\* cited by examiner

*Primary Examiner* — David Bryant
*Assistant Examiner* — Justin Sikorski
(74) *Attorney, Agent, or Firm* — Sughrue Mion, PLLC

(57) ABSTRACT

A vehicle assembly line includes a plurality of carriers that support respective vehicle bodies to which vehicle underbody parts, which are parts that are fitted to the vehicle bodies from below the vehicle bodies, are fitted, and convey the vehicle bodies along the vehicle assembly line. The carriers support the vehicle bodies in such a manner that the longitudinal direction of each of the vehicle bodies is perpendicular to the conveyance direction in which the vehicle bodies are conveyed.

7 Claims, 15 Drawing Sheets

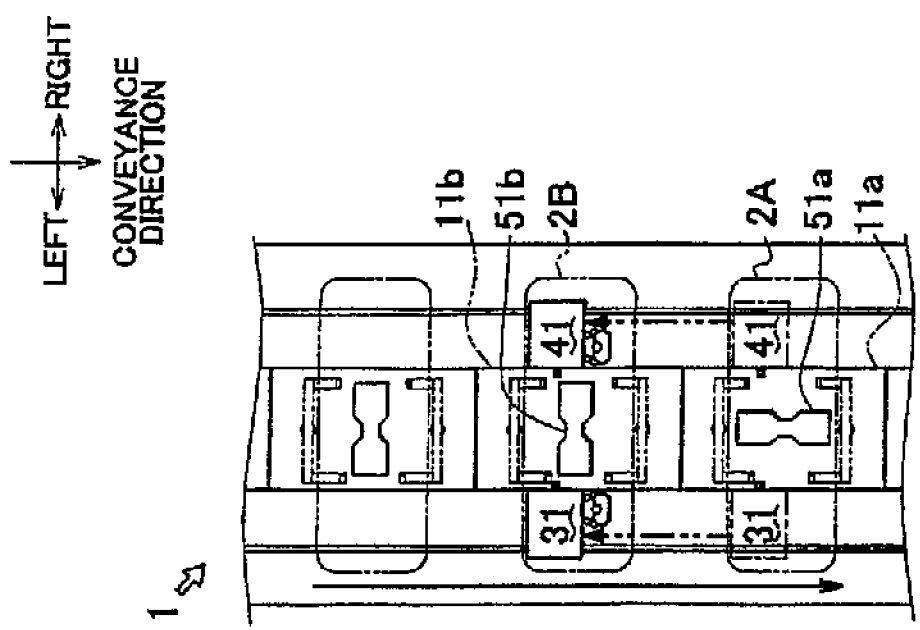
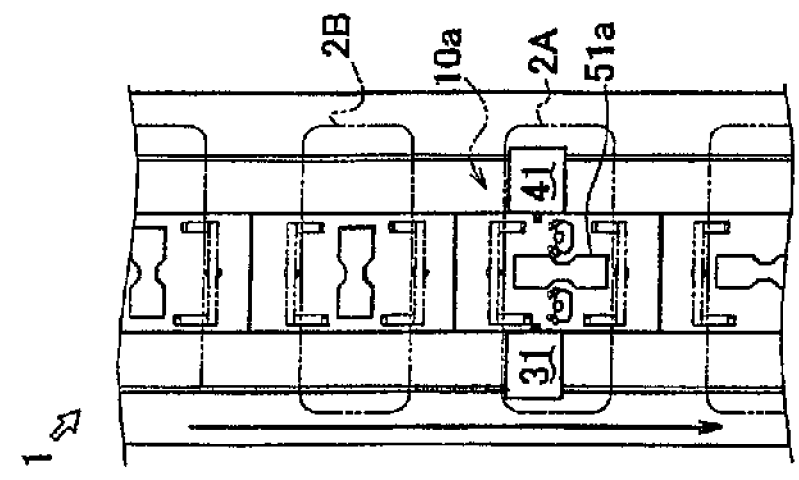
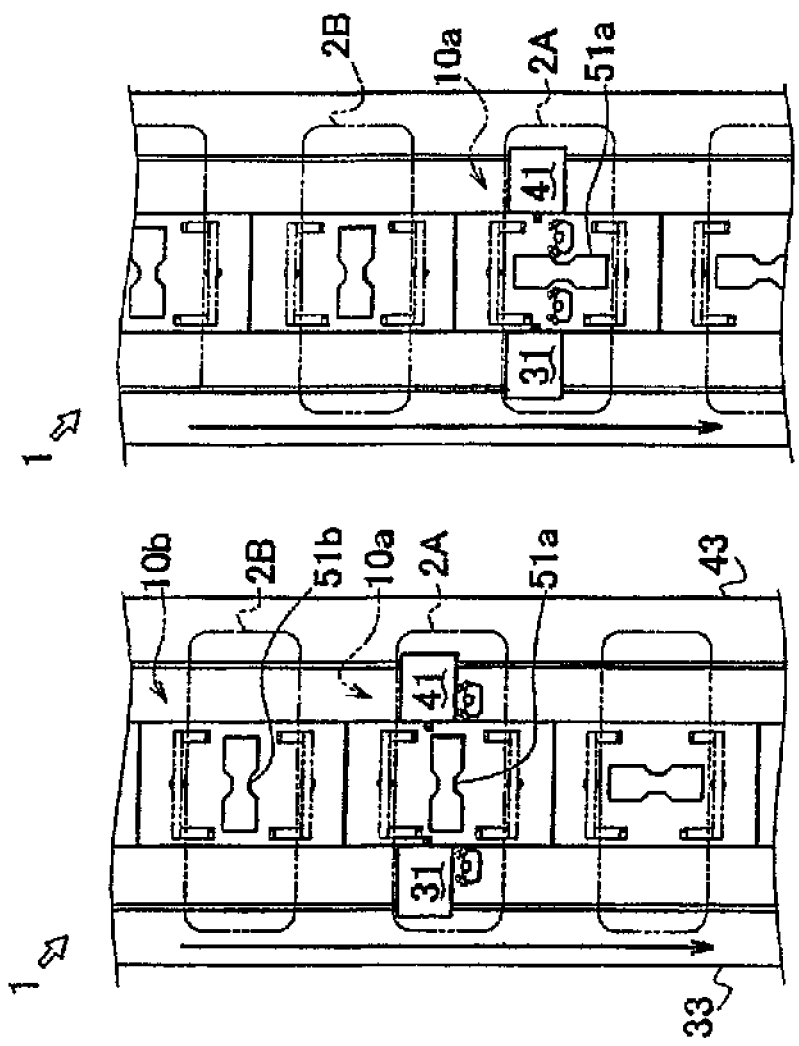

CONVEYANCE DIRECTION

UP / DOWN

VEHICLE ASSEMBLY LINE

CROSS REFERENCE TO RELATED APPLICATION

This application is a National Stage of International Application No. PCT/IB2010/000270, filed Feb. 12, 2010, claiming priority based on Japanese Patent Application No. 2009-033218, filed Feb. 16, 2009, the contents of all of which are incorporated herein by reference in their entirety.

BACKGROUND OF THE INVENTION

1. Field of the Invention

The invention relates generally to a vehicle assembly line, and more specifically to a vehicle underbody assembly line.

2. Description of the Related Art

For example, Japanese Patent Application Publication No. 2009-1182 (JP-A-2009-1182) describes a technology related to a vehicle assembly line for producing vehicles such as automobiles.

As shown in FIG. 15A, in a vehicle assembly line 100 described in JP-A-2009-1182, multiple vehicle bodies 110 are conveyed along the assembly line. More specifically, the vehicle bodies 110 are supported by respective floor friction carriers 120, and the floor friction carriers 120 aligned along the conveyance direction (direction in which the vehicle bodies 110 are moved down the vehicle assembly line 100) are moved along the conveyance direction. In accordance with the movement of the floor friction carriers 120, the vehicle bodies 110 are conveyed. In this case, because the vehicle bodies 110 are supported in such a manner that the longitudinal direction (see an arrow A in FIG. 15A) of the vehicle bodies 110 is parallel to the conveyance direction, the vehicle bodies 110 are conveyed with the longitudinal direction of the vehicle bodies 110 kept parallel to the conveyance direction.

Usually, a worker fits vehicle underbody parts to each of vehicle bodies that move down a vehicle assembly line (performs a fitting work). The worker sequentially performs this fitting work on the vehicle bodies that are conveyed from the upstream side. When fitting the vehicle underbody parts to each vehicle body, the worker fits the vehicle underbody parts to the vehicle body from below the vehicle body. For example, when the worker fits a vehicle underbody part A to a vehicle body a with the use of a tool X, fits a vehicle underbody part B to the vehicle body a with the use of a tool Y, and fits a vehicle underbody part C to the vehicle body a with the use of a tool Z, the worker performs a work 1) in which the worker goes get the vehicle underbody part A and the tool X and then fits the vehicle underbody part A to the vehicle body α. When fitting of the vehicle underbody part A is completed, the worker performs a work 2) in which the worker goes get the vehicle underbody part B and the tool Y and then fits the vehicle underbody part B to the vehicle body α. When fitting of the vehicle underbody part B is completed, the worker performs a work 3) in which the worker goes get the vehicle underbody part C and the tool Z and then fits the vehicle underbody part C to the vehicle body α. The worker sequentially performs the works 1) to 3). When performing these works, the worker fits the vehicle underbody parts A, B and C from below the vehicle body α. Therefore, if the tools X, Y and Z and the vehicle underbody parts A, B and C are located under the vehicle body α, it is possible to minimize the distance between the worker, and the tools X, Y and Z and the vehicle underbody parts A, B and C. As a result, it is possible to efficiently perform the fitting works on the vehicle body α. That is, if the tools used to fit the vehicle underbody parts to the vehicle body (hereinafter, referred to as "tools") and the vehicle underbody parts are located under the vehicle body when the vehicle underbody parts are fitted to the vehicle body, it is possible to efficiently perform the works for fitting the vehicle underbody parts to the vehicle body.

In some cases, the tools are placed on a tool wagon in advance, the worker selects a necessary tool depending on the type of a vehicle underbody part, and uses the selected tool to fit the vehicle underbody part to the vehicle body. If the tool wagon is located under the vehicle body when the vehicle underbody parts are fitted to the vehicle body, it is possible to minimize the distance between the worker and the tools. As a result, it is possible to efficiently perform the works for fitting the vehicle underbody parts to the vehicle body. The worker uses the same tools to fit the vehicle underbody parts to each of the vehicle bodies that are sequentially conveyed. Therefore, if it is possible to form a path along which the tool wagon is conveyed (hereinafter, referred to as "conveyance path") and which connects the spaces under the vehicle bodies to each other, the tool wagon is moved along the conveyance path. As a result, the tool wagon moves under the vehicle bodies. Thus, the tool wagon is located under the vehicle body when the vehicle underbody parts are fitted to the vehicle body. In addition, it is possible to fit the vehicle underbody parts to the vehicle bodies with the use of the same tools.

If the vehicle underbody parts are located under the vehicle body when the vehicle underbody parts are fitted to the vehicle body, it is possible to minimize the distance between the worker and the vehicle underbody parts. As a result, it is possible to efficiently perform the works for fitting the vehicle underbody parts to the vehicle body. In recent yeas, the types of vehicle underbody parts vary depending on the types of vehicles (types of vehicle bodies) due to diversification of the types of vehicles. Therefore, in order to minimize occurrence of an error in selection of vehicle underbody parts when the vehicle underbody parts are fitted to the vehicle body and to make it easier to deal with various types of vehicles, a set of vehicle underbody parts for each one of the vehicle bodies is prepared in advance, the vehicle bodies and the sets of vehicle underbody parts corresponding to the respective vehicle bodies are associated with each other, and then the vehicle bodies and the vehicle underbody parts are moved down the assembly line. Therefore, if a space in which the vehicle underbody parts are placed (hereinafter, referred to as "part space") is formed under each vehicle body, a set of vehicle underbody parts for each one of the vehicle bodies is placed under the vehicle body in advance, the vehicle bodies and the sets of vehicle underbody parts corresponding to the respective vehicle bodies are associated with each other, and then the vehicle bodies and the vehicle underbody parts are moved down the assembly line. Thus, the set of vehicle underbody parts is located under the corresponding vehicle body when the vehicle underbody parts are fitted to the vehicle body.

As described above, if the conveyance path is formed in the vehicle assembly line and the part space is formed under each vehicle body, the tools and the vehicle underbody parts may be located under the vehicle body when the vehicle underbody parts are fitted to the vehicle body. As a result, it is possible to efficiently perform the works for fitting the vehicle underbody parts to the vehicle body. In order to avoid the situation where the tool wagon hits the vehicle underbody parts when the tool wagon is moved, the conveyance path and the each part space need to be formed so as not to overlap with each other.

As shown in FIGS. 15A and 15B, in the vehicle assembly line 100 described in JP-A-2009-1182, a conveyance path 130 that connects the spaces under the vehicle bodies 110 to each other in the conveyance direction is formed, and part spaces are formed under the vehicle bodies 110. In this case, because the vehicle bodies 110 are conveyed with the longitudinal direction of the vehicle bodies 110 kept parallel to the conveyance direction, the conveyance path 130 is the space that connects the spaces under the vehicle bodies 110 to each other in the longitudinal direction of the vehicle bodies 110. Thus, in order to form the part space under each vehicle body 110 separately from the conveyance path 130, the part space need to be offset from the conveyance path 130 in the lateral direction of the vehicle body 110 (the direction perpendicular to the longitudinal direction of the vehicle body 110, for example, the direction of an arrow B in FIG. 15B). However, the lateral length of the vehicle body does not greatly vary depending on the types of vehicle bodies, and is usually set to a value that is within a range from 1700 mm to 1800 mm and that is obviously shorter than the longitudinal length of the vehicle body. Accordingly, if the conveyance path 130 is formed, it is difficult to form the part space under each vehicle body 110. With the technology described in JP-A-2009-1182, it is difficult to sufficiently meet the demand to locate the tool and the vehicle underbody parts under the vehicle body when the vehicle parts are fitted to the vehicle body, and, consequently, it is difficult to contribute to an improvement in the efficiency of the works for fitting the vehicle underbody parts to the vehicle body.

SUMMARY OF THE INVENTION

The invention provides a vehicle assembly line that enables a worker to efficiently perform works for fitting vehicle underbody parts to each vehicle body.

An aspect of the invention relates to a vehicle assembly line, including a plurality of carriers that support respective vehicle bodies to which vehicle underbody parts, which are parts that are fitted to the vehicle bodies from below the vehicle bodies, are fitted, and convey the vehicle bodies along the vehicle assembly line. The carriers support the vehicle bodies in such a manner that the longitudinal direction of each of the vehicle bodies is perpendicular to the conveyance direction in which the vehicle bodies are conveyed.

In the aspect of the invention described above, there may be formed a conveyance path which connects spaces under the vehicle bodies supported by the carriers to each other, and through which a tool used to fit the vehicle underbody parts to the vehicle bodies is conveyed; and part spaces in which the vehicle underbody parts are arranged may be formed separately from the conveyance path, at positions that are under the vehicle bodies supported by the carriers and that are offset from the conveyance path in the longitudinal direction of each of the vehicle bodies.

In the aspect of the invention described above, the conveyance path may include a first conveyance path that connects spaces under front portions of the vehicle bodies to each other, and a second conveyance path that connects spaces under rear portions of the vehicle bodies to each other; and each of the part spaces may be formed between the first conveyance path and the second conveyance path.

In the aspect of the invention described above, the part spaces may be formed on the carriers; and the conveyance path may be located next to the carrier in the direction perpendicular to the conveyance direction.

In the aspect of the invention described above, the carriers may move on a floor.

According to the aspect of the invention described above, it is possible to efficiently perform the works for fitting the vehicle underbody parts to each vehicle body.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIGS. 10A to 10C are views showing the procedures when a first worker and a second worker fit vehicle underbody parts to vehicle bodies, FIG. 10A showing the state where the first and second workers are fitting the vehicle underbody parts to a front portion and a rear portion of a vehicle body 2A, FIG. 10B showing the state where the first and second workers are fitting the vehicle underbody parts to a center portion of the vehicle body 2A, and FIG. 10C showing the state where the first and second workers are moving to a vehicle body 2B to which the vehicle underbody parts will be fitted after fitting of the vehicle underbody parts to the vehicle body 2A is completed;

DETAILED DESCRIPTION OF THE EMBODIMENTS

Hereafter, a vehicle assembly line 1 according to a first embodiment of the invention will be described with reference to the accompanying drawings.

Figure 1:
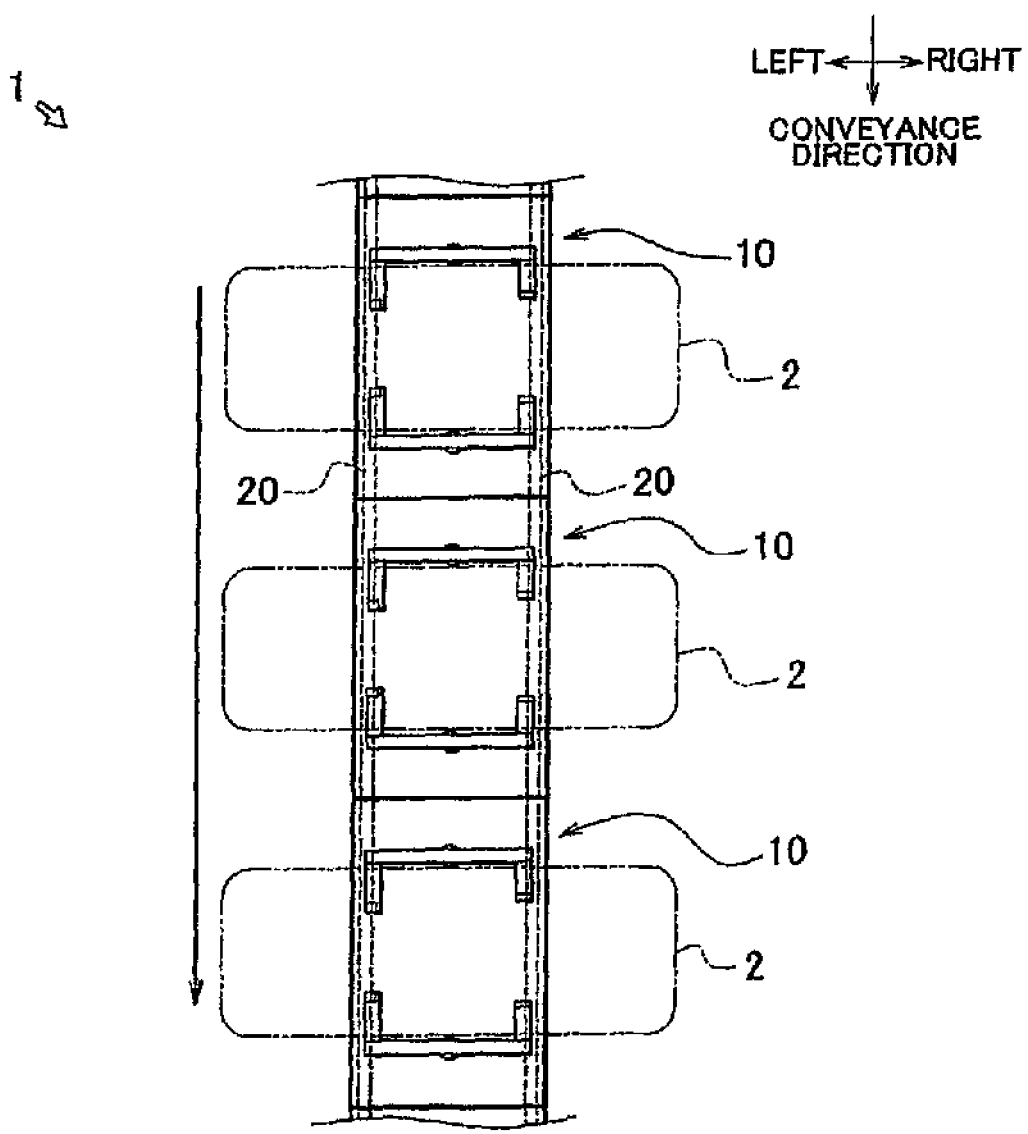
FIG. 1 is a view schematically showing a vehicle assembly line according to a first embodiment of the invention.

As shown in FIG. 1, the vehicle assembly line 1 is a vehicle underbody assembly line used when vehicles such as automobiles are produced, that is, a vehicle underbody assembly line used to fit vehicle underbody parts (i.e., parts that are fitted to each vehicle body 2 from below the vehicle body 2, for example, an insulator, a brace, a PKB cable, a fender liner, and an inlet pipe) to each of the vehicle bodies 2 that move down the vehicle assembly line 1. The vehicle assembly line 1 includes floor friction carriers 10 and rails 20. The floor friction carriers 10 supporting the respective vehicle bodies 2 are aligned in a row with no space left therebetween in the conveyance direction (the direction in which the vehicle bodies 2 move down the line). In this state, the floor friction carriers 10 move on the rails 20, thereby conveying the respective vehicle bodies 20. At this time, workers sequentially perform works for fitting the vehicle underbody parts to each of the vehicle bodies 2 while standing under the vehicle body 2.

Figure 2:
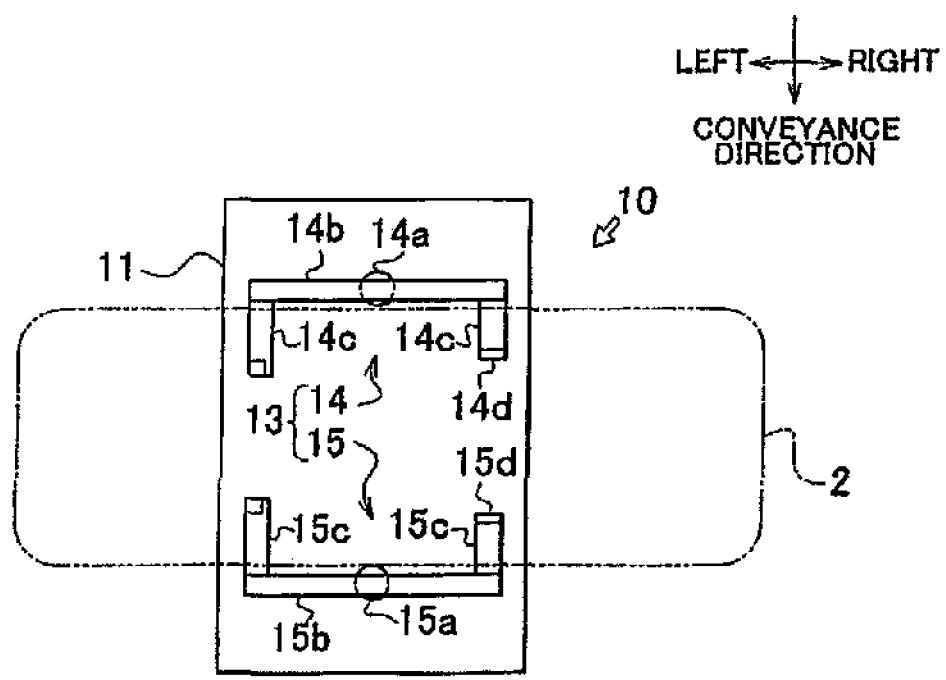
FIG. 2 is an enlarged view showing a portion in FIG. 1.
Figure 3:
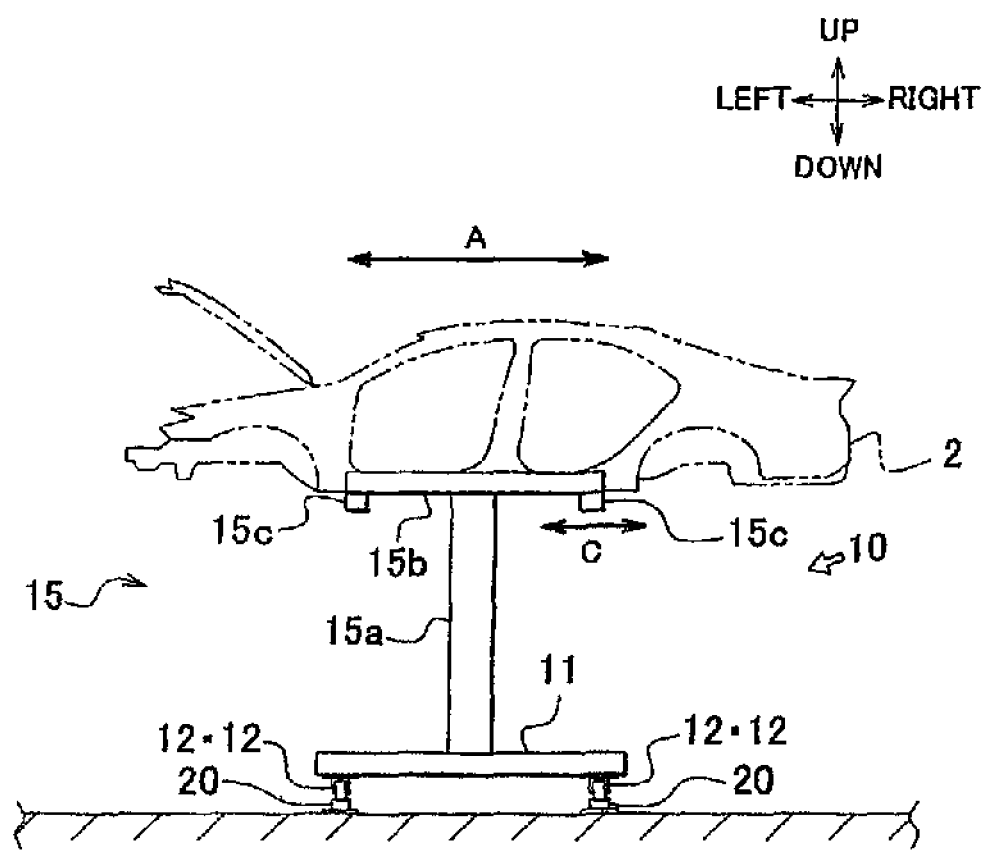
FIG. 3 is a view showing the portion in FIG. 2 when viewed in the conveyance direction.
Figure 4:
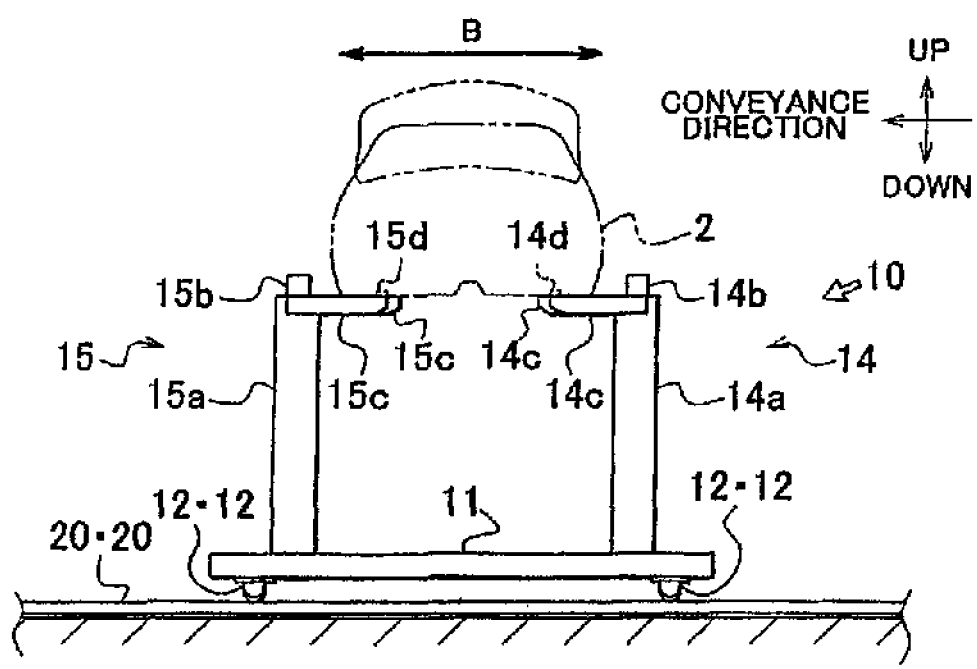
FIG. 4 is a view showing the portion in FIG. 2 viewed from the right side.

As shown in FIGS. 2, 3 and 4, the floor friction carrier 10 is used to support and convey the vehicle body 2. Each floor friction carrier 10 includes a base 11, four wheels 12*m* and a support portion 13.

The base 11 is a sufficiently rigid flat plate member of which the top face is a horizontal face. Thus, the vehicle underbody parts are placed on the base 11, and the workers are able to perform the fitting work on the base 11. The length of the base 11 in the conveyance direction is set to be longer than the lateral length of the vehicle body 2 (the length of the vehicle body 2 in the direction perpendicular to the longitudinal direction of the vehicle body 2) (the lateral length of the vehicle body 2+α, for example, a value within a range from 2500 mm to 3500 mm), and the length of the base 11 in the right-left direction (the length of the base 11 in the direction that is perpendicular to the conveyance direction and that is horizontal) is set to be shorter than the wheelbase of the vehicle body 2 (for example, approximately 2000 mm). An arrow A in FIG. 3 indicates the longitudinal direction of the vehicle body 2, and an arrow B in FIG. 4 indicates the lateral direction of the vehicle body 2.

The wheels 12 are fixed to the four corners of the bottom face of the base 11, and support the base 11 so that the base 11 is able to move.

The support portion 13 is fixed to the top face of the base 11, and supports the vehicle body 2 at a predetermined height (height at which a worker can smoothly fit the vehicle underbody parts to the vehicle body 2, for example, a height that is slightly less than the height of the worker). The support portion 13 is a sufficiently rigid member that is made mainly of iron. The support portion 13 includes an upstream-side support portion 14 and a downstream-side support portion 15. The upstream-side support portion 14 and the downstream-side support portion 15 are formed in the same shape, and arranged on the base 11 with a predetermined distance kept therebetween in the conveyance direction. The upstream-side support portion 14 and the downstream-side support portion 15 are arranged so as to be symmetric with respect to the center line of the base 1 that extends in the right-left direction. The upstream-side support portion 14 is arranged upstream of the downstream-side support portion 15 in the vehicle assembly line. The support portion 13 supports the vehicle body 2 in such a manner that the longitudinal direction of the vehicle body 2 is perpendicular to the conveyance direction and the vehicle body 2 is located between the upstream-side support portion 14 and the downstream-side support portion 15.

The upstream-side support portion 14 includes a supporting column 14*a*, a main arm 14*b*, and arms 14*c*. The supporting column 14*a* has a column shape, one end thereof is fixed to a center portion of the base 11 in the right-left direction of the based 11 (center position in the direction perpendicular to the direction in which the vehicle bodies 2 are conveyed), and the other end thereof extends upward. The supporting column 14*a* has such a diameter that the supporting column 14*a* is able to support the vehicle body 2 (for example, approximately 200 πmm). The main arm 14*b* has a rod shape, a center portion thereof is fixed to the supporting column 14*a*, and respective ends thereof project rightward and leftward from the center portion. The main arm 14*b* is arranged at a predetermined height from the base 11 (for example, approximately 1600 mm). A right end portion of the main arm 14*b* is extensible in the right- and left direction, whereby the length of the main arm 14*b* in the right-and-left direction can be changed. The arms 14*c* are formed in a rod shape, one ends of the arms 14*c* are fixed to a lower left end portion and a lower right end portion of the main arm 14*b*, and the other ends of the arms 14*c* extend horizontally and toward the downstream side (toward the downstream-side support portion 15). A fixing pin 14*d* that extends upward is fixed to the other end of the right arm 14*c*.

The downstream-side support portion 15 includes a supporting column 15*a*, a main arm 15*b*, and arms 15*c*. The supporting column 15*a*, the main arm 15*b* and the arms 15*c* have the same configuration as those of the supporting column 14*a*, the main arm 14*b* and the arms 14*c*. A fixing pin 15*d* having the same configuration as that of the fixing pin 14*d* is fixed to the right arm 15*c*. The detailed description concerning the supporting column 15*a*, the main arm 15*b* and the arms 15*c* will not be provided.

The supporting column 14*a* (main arm 14*b*) and the supporting column 15*a* (main arm 15*b*) are arranged with a predetermined distance (distance that is slightly longer than the lateral length of the vehicle body 2, for example, approximately 2000 mm) kept therebetween in the conveyance direction. Between the main arm 14*b* and the main arm 15*b*, the arms 14*c* and the arms 15*c* extend from the main arm 14*b* and the main arm 15*b*, respectively, and the vehicle body 2 is placed on the arms 14*c* and the arms 15*c* in such a manner that the longitudinal direction of the vehicle body 2 is perpendicular to the conveyance direction. As described above, because the arms 14*c* and the arms 15*c* are fixed to the lower ends of the main arm 14*b* and the lower ends of the main arm 15*b*, respectively, the main arms 14*b* and the main arms 15*b* are arranged at positions that are higher than the bottom face of the vehicle body 2 that is placed on the arms 14*c* and the arms 15*c*. Because the main arms 14*b* and 15*b* are arranged at the highest possible positions, the workers can smoothly pass under the main arms 14*b* and 15*b*. In the first embodiment of the invention, a longitudinal center portion of the vehicle body 2 is placed on the arms 14*c* and the arms 15*c*, and a front portion of the vehicle body 2 is oriented leftward and a rear portion of the vehicle body 2 is oriented rightward. Because the length of the base 11 in the right-left direction is set to be shorter than the wheelbase of the vehicle body 2, the front portion of the vehicle body 2 projects leftward from the base 11 and the rear portion of the vehicle body 2 projects rightward from the base 11.

If the vehicle body 2 is placed on the arms 14c and the arms 15c in such a manner that the longitudinal direction of the vehicle body 2 is perpendicular to the conveyance direction, the fixing pins 14d of the right arm 14c and the fixing pin 15d of the right arm 15c are engaged with the rear portion of the vehicle body 2. Thus, the vehicle body 2 is fixed to the support portion 13. Then, as described above, because the lengths of the main arms 14b and 15b in the right-left direction can be changed, the positions at which the fixing pins 14d and 15d are engaged with the vehicle body 2 can be changed in the right-left direction (toward the front of the vehicle body 2 or toward the rear of the vehicle body 2). Therefore, even if the longitudinal length of the vehicle body 2 varies depending on the types of vehicles, adjustment is flexibly made (see an arrow C in FIG. 3).

As shown in FIGS. 1, 3 and 4, the rails 20 are used to guide the floor friction carriers 10 in the conveyance direction. The rails 20 are fixed onto a floor, and extend along the conveyance direction while being parallel to each other. The wheels 12 are fitted to the rails 20, and the floor friction carriers 10 move on the rails 20 in the conveyance direction.

When a floor friction roller (not shown) of a floor friction roller drive unit is pressed to the base 11, a thrust is applied to the floor friction carrier 10. As a result, the floor friction carrier 10 moves on the rails 20 in the conveyance direction.

Figure 5:
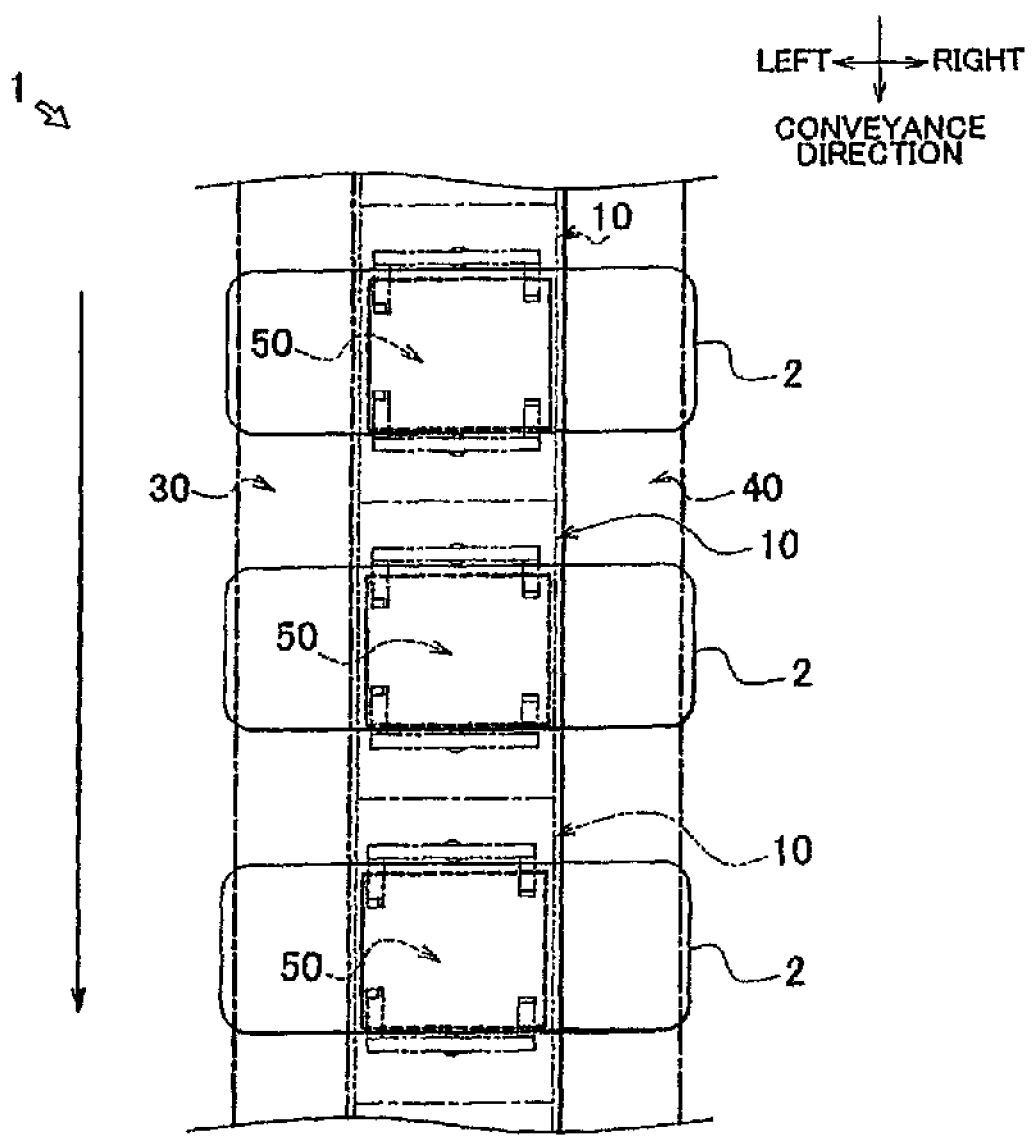
FIG. 5 is a view showing the positions of a first conveyance path, a second conveyance path, and part spaces in FIG. 1

As shown in FIG. 5, the floor friction carriers 10 aligned in a row with no space left therebetween move on the rails 20, thereby conveying the vehicle bodies 2. As described above, the vehicle bodies 2 are supported by the floor friction carriers 10 (support portions 13) in such a manner that the longitudinal direction of the vehicle bodies 2 is perpendicular to the conveyance direction. Therefore, as the floor friction carriers 10 are moved, the vehicle bodies 2 are conveyed while being aligned in the conveyance direction in such a manner that the longitudinal direction of the vehicle bodies 2 is perpendicular to the conveyance direction.

Figure 6:
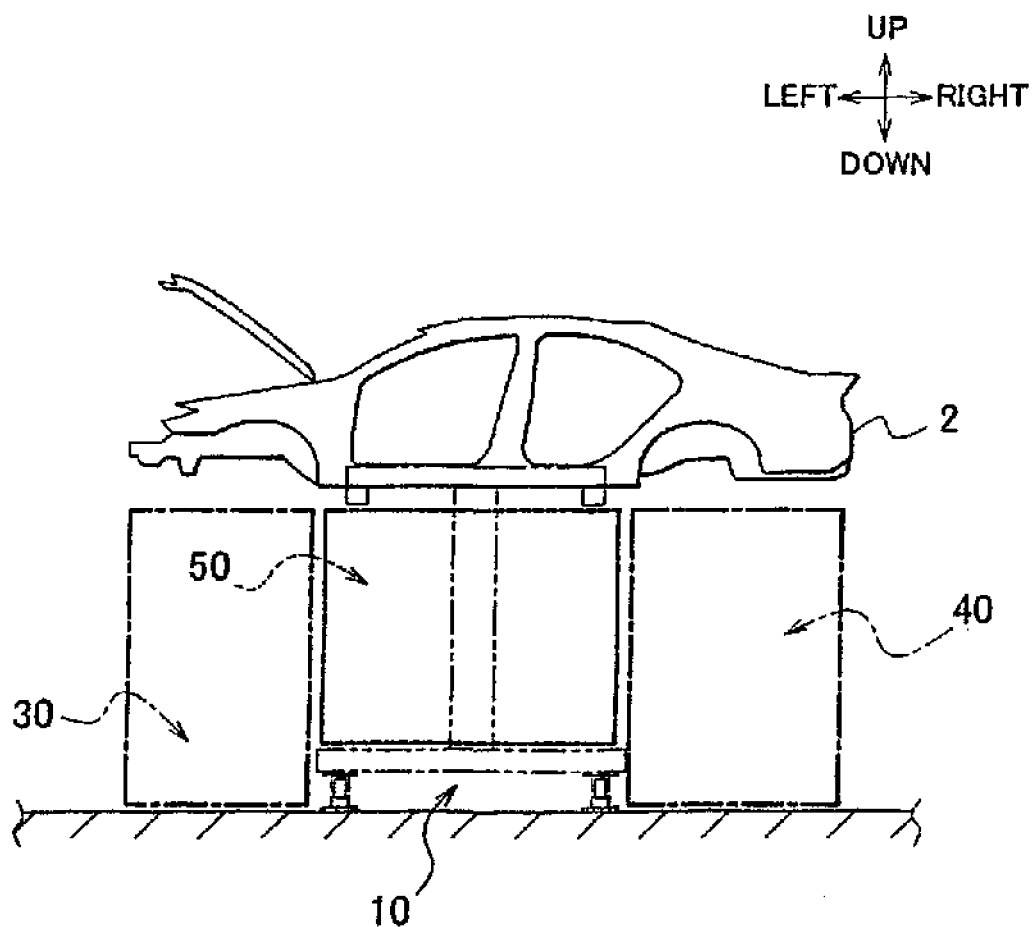
FIG. 6 is a view showing the positions of the first conveyance path, the second conveyance path, and the part space in FIG. 3.

As shown in FIGS. 5 and 6, a first conveyance path 30, a second conveyance path 40 and part spaces 50 are formed in the vehicle assembly line 1. The first conveyance path 30 is a space that connects the spaces under the front portions of the vehicle bodies 2 to each other in the conveyance direction. The second conveyance path 40 is a space that connects the spaces under the rear portions of the vehicle bodies 2 to each other in the conveyance direction. The part spaces are the spaces under the center portions of the vehicle bodies 2. The positional relationship among the first conveyance path 30, the second conveyance path 30 and the part spaces 50 will be described below. The first conveyance path 30 and the second conveyance path 40 are formed on the left side and the right side of the floor friction carriers 10 that are aligned in the conveyance direction, respectively. A predetermined distance is kept between the first conveyance path 30 and the second conveyance path 40. The part spaces 50 are formed between the first conveyance path 30 and the second conveyance path 40 in such a manner that a predetermined distance is kept between the adjacent part spaces 50 in the conveyance direction.

Figure 7:
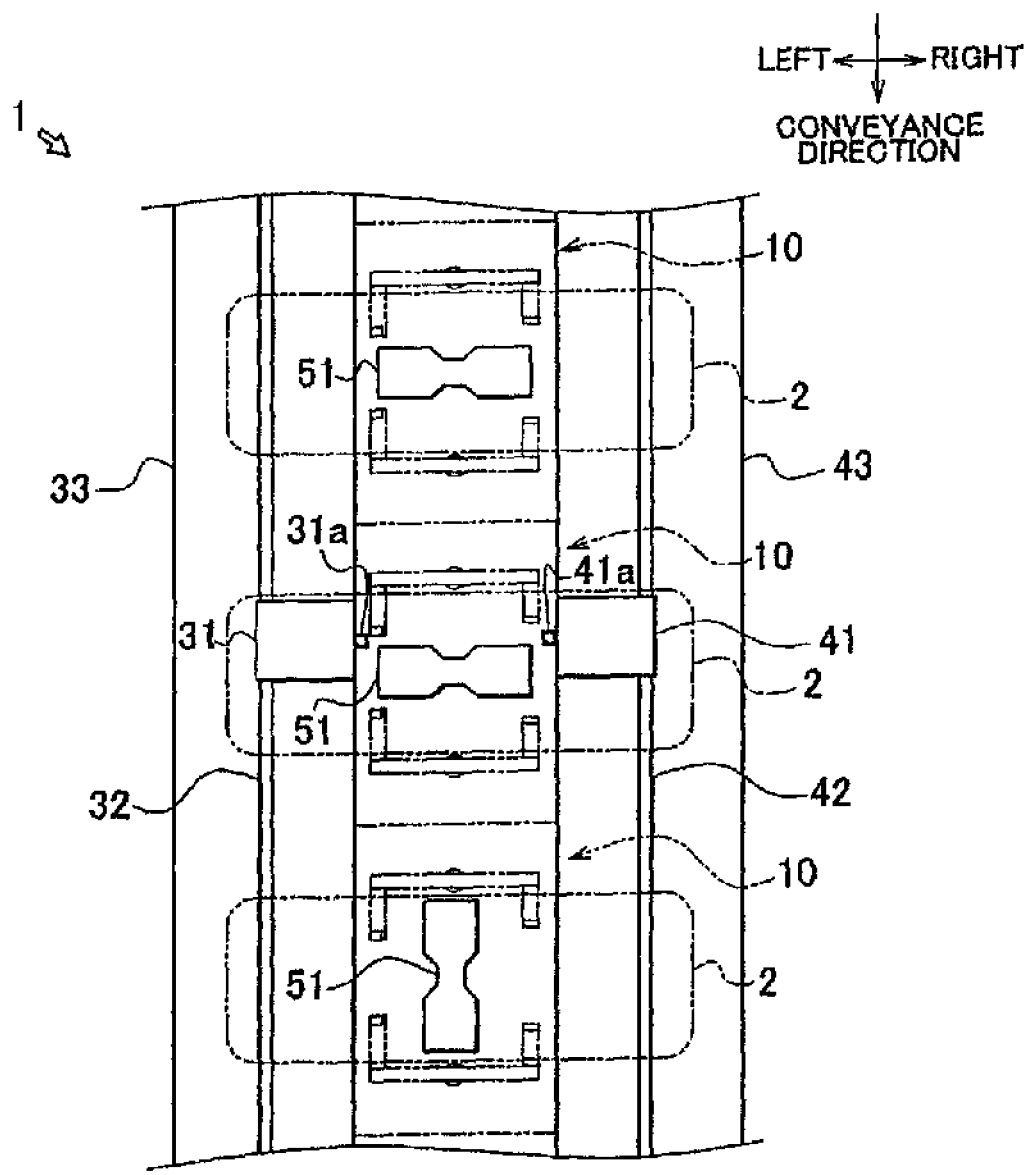
FIG. 7 is a view showing the positions of a first tool wagon, a first rail, a first work platform, a second tool wagon, a second rail, a second work platform and SPS carriers.
Figure 8:
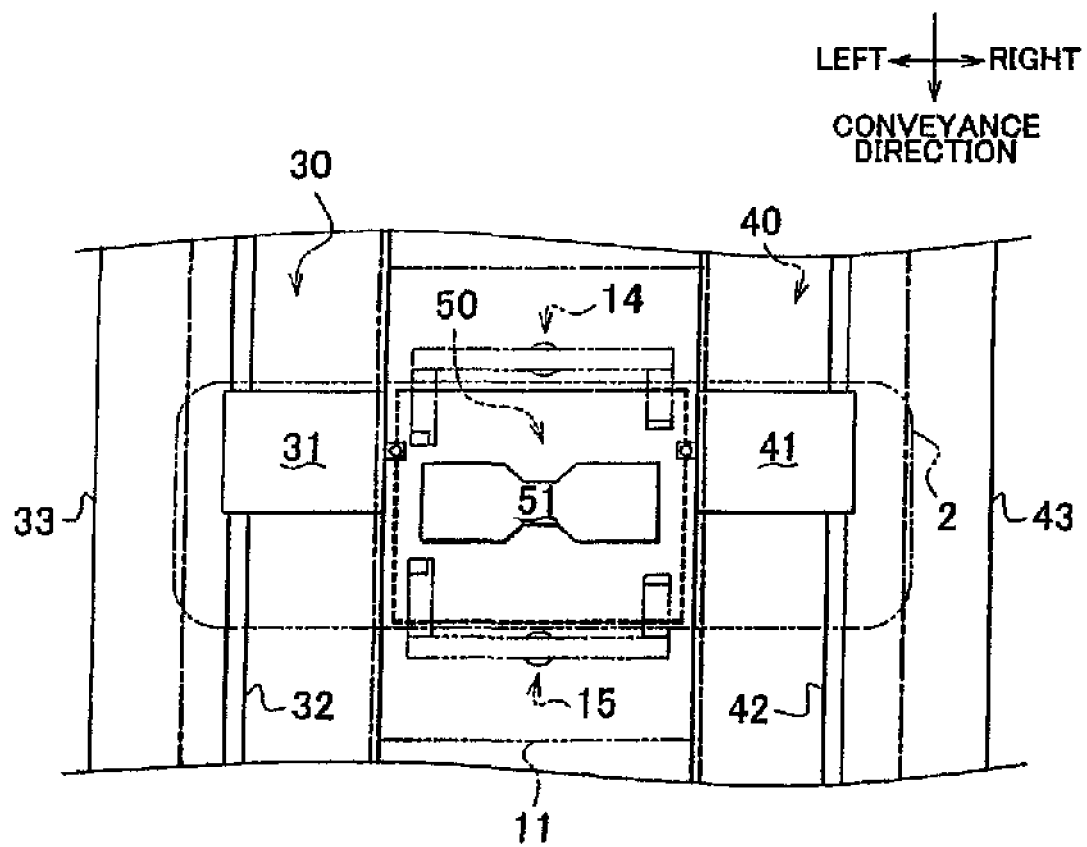
FIG. 8 is a view showing the state where the first tool wagon, the first rail and the first work platform are placed in the first conveyance path, the second tool wagon, the second rail and the second work platform are placed in the second conveyance path, and the SPS carrier is placed in each part space.
Figure 9:
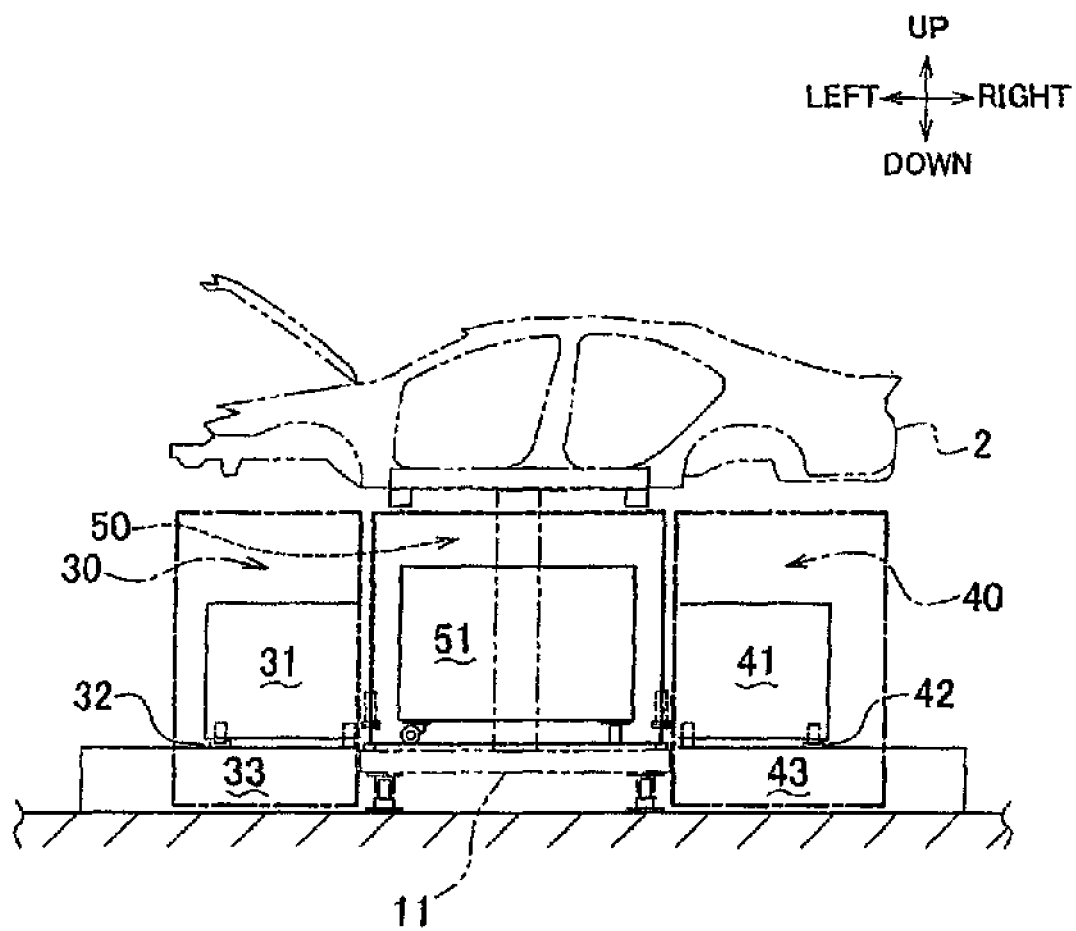
FIG. 9 is a view showing a portion in FIG. 8 when viewed in the conveyance direction.

The first conveyance path 30 is used to convey tools that are used when the vehicle underbody parts are fitted to the vehicle body 2. Examples of the tools include a wrench, a pincer, and a bolt. The first conveyance path 30 is a space that connects the spaces, which are under the front portions of the vehicle bodies 2 and which are on the left side of the floor friction carriers 10, to each other in the conveyance direction (the lateral direction of the vehicle bodies 2). As shown in FIGS. 7, 8 and 9, a first tool wagon 31, a first rail 32 and a first work platform 33 are placed in the first conveyance path 30. The first rail 32 is placed on the first work platform 33, and the first tool wagon 31 moves on the first rail 32.

The first tool wagon 31 is used to convey the tools, and the tools are placed on the first tool wagon 31. Two right wheels and two left wheels are fitted to the bottom face of the first tool wagon 31. A first synchronizing portion 31a is fitted to a right portion of the first tool wagon 31. The first synchronizing portion 31a is used to bring the first tool wagon 31 into synchronization with the floor friction carrier 10. For example, if the first synchronizing portion 31a is engaged with a projection portion (not shown) formed at a predetermined position on the base 11, the first tool wagon 31 is brought into synchronization with the floor friction carrier 10 that has the projection portion. Thus, the first tool wagon 31 moves together with the floor friction carrier 10. When the first synchronizing portion 31a is disengaged from the projection portion on the base 11, synchronization between the first tool wagon 31 and the floor friction carrier 10 is cancelled. Thus, the first tool wagon 31 moves independently from the floor friction carrier 10 or stops.

The first rail 32 is used to guide the first tool wagon 31 in the conveyance direction, and is arranged along the conveyance direction. The wheels fitted to the left-side portion of the first tool wagon 31 are fitted to the first rail 32, and the first tool wagon 31 moves on the first rail 32.

The first work platform 33 is used to support the first tool wagon 31. The first work platforms 33 is a plate member that extends in the conveyance direction for the vehicle bodies 2, and is arranged on the left of the bases 11 with substantially no space left between the first work platform 33 and the bases 11. The first rail 32 is fixed to the top face of the first work platform 33 and the first tool wagon 31 is placed on the first work platform 33. In addition the first work platform 33 is fixed onto the floor. The first rail 32 is arranged on the first work platform 33 at such a position that the first rail 32 connects the spaces under the front portions of the vehicle bodies 2 to each other. Thus, when the first tool wagon 31 moves on the first rail 32, the first tool wagon 31 moves under the front portions of the vehicle bodies 2 along the conveyance direction. Because the front portions of the vehicle bodies 2 project leftward from the bases 11 as described above, it is possible to arrange the first rail 32 under the front portions of the vehicle bodies 2. The first work platform 33 has a top face that is a horizontal face, and the workers can perform the fitting works on the first work platform 33. Because the first work platform 33 has a height that is substantially the same as the height of each base 11, there is not a step between the first work platform 33 and each base 11. As a result, the workers can smoothly move between the first work platform 33 and each base 11.

As shown in FIGS. 5 and 6, the second conveyance path 40 is used to convey the tools. The second conveyance path 30 is a space, which connects the spaces that are under the rear portions of the vehicle bodies 2 and which are on the right side of the floor friction carriers 10, to each other along the conveyance direction. As shown in FIGS. 7, 8 and 9, a second tool wagon 41, a second rail 42 and a second work platform 43 are arranged in the second conveyance path 40. On the second work platform 43, the second rail 42 is placed at such a position that the spaces under the rear portions of the vehicle bodies 2 are connected to each other in the conveyance direction. The second tool wagon 41 can move on the second rail 42. When the second tool wagon 41 moves on the second rail 42, the second tool wagon 41 moves under the rear portions of the vehicle bodies 2 in the conveyance direction. The second tool wagon 41, the second rail 42 and the second work platform 43 have the same configurations as those of the first tool wagon 31, the first rail 32 and the first work platform 33 in the first conveyance path 30. The second tool wagon 41, the second rail 42 and the second work platform 43, and the firs tool wagon 31, the first rail 32 and the first work platform 33 are symmetric with respect to the center line of the floor friction carriers 10 that extends in the conveyance direction. As described above, a second synchronizing portion 41a is fitted to the second tool wagon 41. The second tool wagon 41 and the floor friction carrier 10 are moved together with each other by the second synchronizing portion 41a. The second tool wagon 41 moves or stops depending on whether the second synchronizing portion 41a is engaged with the projection portion of the base 11. The detailed description concerning the second tool wagon 41, the second rail 42 and the second work platform 43 will not be provided.

As shown in FIGS. 5 and 6, the part spaces 50 are the spaces in which the vehicle underbody parts that will be fitted to the vehicle bodies 2 are placed. The part spaces 50 are the spaces under the center portions of the vehicle bodies 2 (spaces between the center portions of the vehicle bodies 2 and the floor friction carriers 10). As shown in FIGS. 7, 8 and 9, the part spaces 50 are formed on SPS carriers 51.

The vehicle underbody parts are placed on the SPS carriers 51. The vehicle underbody parts corresponding to the types of respective vehicle bodies 2 are placed on the SPS carriers 51. Each SPS carrier 51 is placed on the base 11, and is long in the horizontal direction. The longitudinal length of the SPS carrier 51 in the horizontal direction is shorter than the right-left length of the base 11, and is shorter than the distance between the upstream-side support portion 14 and the downstream-side support portion 15. Thus, each SPS carrier 51 does not protrude from the base 11 into the first work platform 33 or the second work platform 43, and is fitted between the upstream-side support portion 14 and the downstream-side support portion 15. Therefore, the SPS carrier 51 is fitted within the part space 50. Wheels are fitted to the respective four corners of the bottom face of the SPS carrier 51, and the SPS carrier 51 is placed on the base 11 via the wheels. Therefore, the SPS carrier 51 can move on the base 11 (within the part space 50). Thus, the workers can move the SPS carrier 51 to such a position that the workers can easily perform the fitting works. As a result, it is possible to efficiently fit the vehicle underbody parts to the vehicle body 2. For example, when the worker fits the vehicle underbody parts to the front portion or the rear portion of the vehicle body 2, that is, when the worker performs the fitting work in the conveyance path 30 or 40 (on the work platform 33 or 43), the worker places the SPS carrier 51 in such a position that the longitudinal direction of the SPS carrier 51 is parallel to the right-left direction so that the distance between the worker and the SPS carrier 51 is not too long. Thus, the vehicle underbody parts are located near the worker (see FIG. 11A). When the worker fits the vehicle underbody parts to the center portion of the vehicle body 2, that is, when the worker performs the fitting work in the part space 50 (on the base 11), the worker places the SPS carrier 51 in such a position that the longitudinal direction of the SPS carrier 51 is parallel to the conveyance direction so that a sufficient workspace is ensured in the right-left direction (see FIG. 11B).

The procedures when the works for fitting the parts to the vehicle bodies 2 that move down the vehicle assembly line 1 are performed will be described below. The works for fitting the vehicle underbody parts to the vehicle bodies 2 are performed by a first worker who is in charge of fitting the vehicle underbody parts to the front-side portion of the vehicle body 2 and a second worker who is in charge of fitting the vehicle underbody parts to the rear-side portion of the vehicle 2. In the following description, as shown in FIGS. 10 and 11, the fitting works are performed on a vehicle body 2A that is one of the vehicle bodies 2 and a vehicle body 2B that is immediately upstream of the vehicle body 2A. First, the fitting works are performed on the vehicle body 2A, and then performed on the vehicle body 2B. The vehicle body 2A is supported by a floor friction carrier 10a (base 11a) that is one of the floor friction carriers 10, and a SPS carrier 51a that is one of the SPS carriers 51 is placed under the center portion of the vehicle body 2A. Similarly, the vehicle body 2B is supported by a floor friction carrier 10b (base 11b), and a SPS carrier 51b is placed under the center portion of the vehicle body 2B.

Figure 11A:
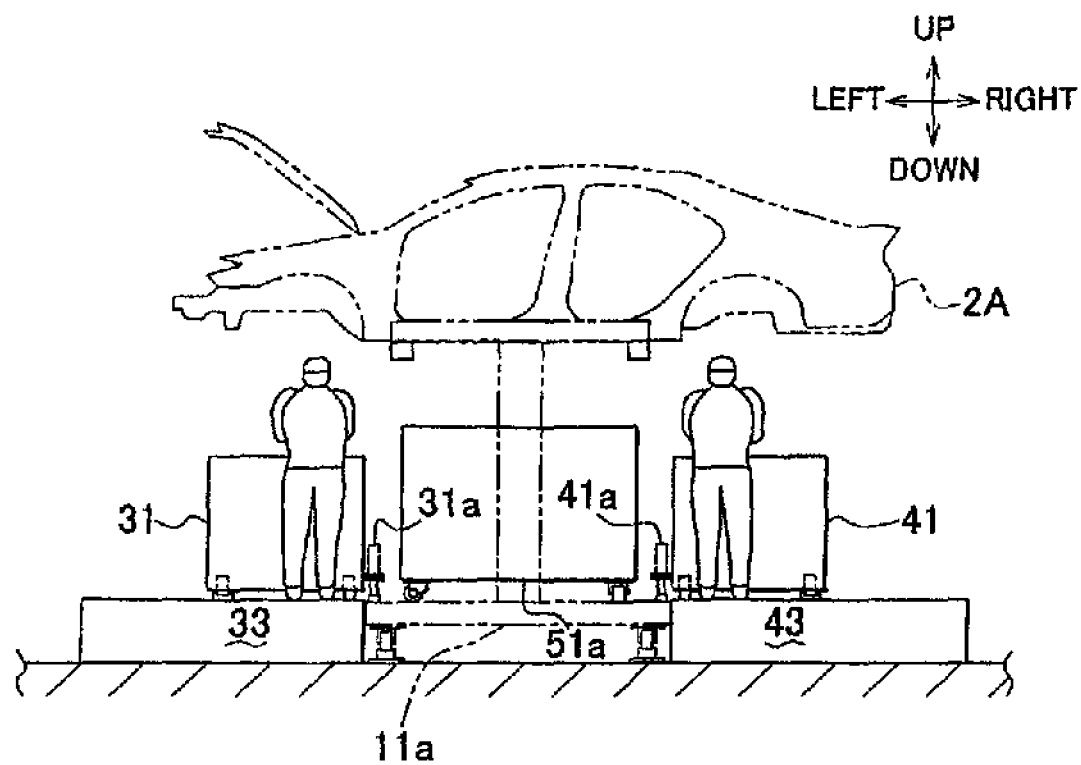
FIGS. 11A and 11B are view showing the state where the first and second workers are fitting the vehicle underbody parts to each vehicle body, FIG. 11A showing the state in FIG. 10A viewed in the conveyance direction, and FIG. 11B showing the state in FIG. 10B viewed in the conveyance direction.
Figure 11B:
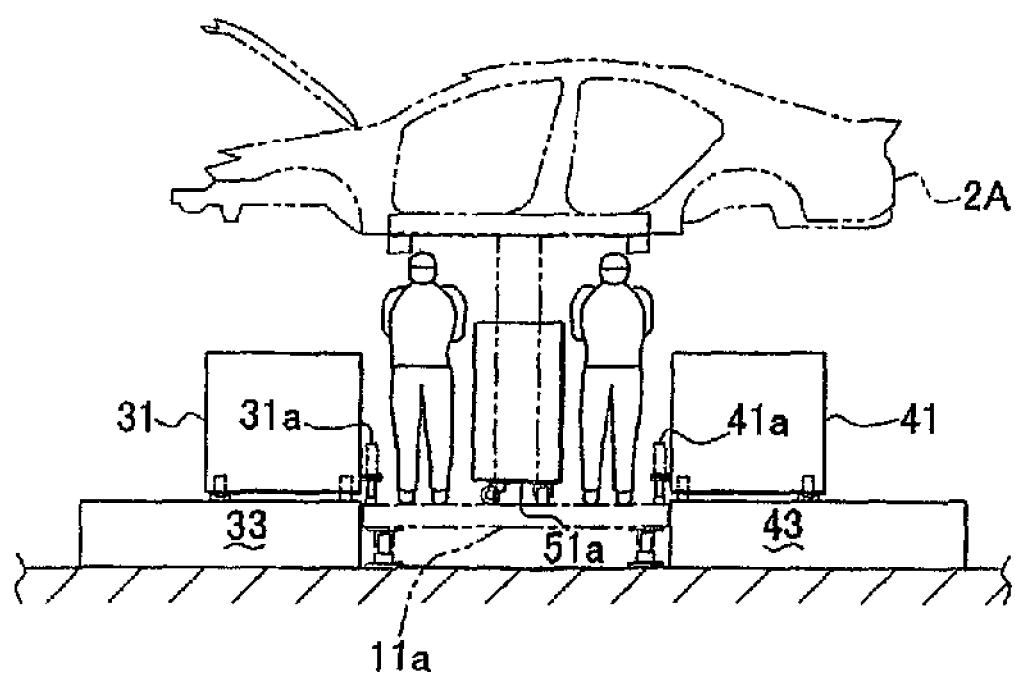

In the state shown in FIGS. 10A, 10B, 11A and 11B, the first worker and the second worker perform the fitting works on the vehicle body 2A supported by the floor friction carrier 10a. At this time, the first tool wagon 31 and the second tool wagon 41 are synchronized with the floor friction carrier 10a by the first synchronizing portion 31a and the second synchronizing portion 41a, respectively, the first tool wagon 31 is placed under the front portion of the vehicle body 2A, and the second tool wagon 41 is placed under the rear portion of the vehicle body 2A. The first worker is under the front portion of the vehicle body 2A, and fits the vehicle underbody parts placed on the SPS carrier 51a to the front portion of the vehicle body 2A with the use of the tools placed on the first tool wagon 31. The second worker is under the rear portion of the vehicle body 2A, and fits the vehicle underbody parts placed on the SPS carrier 51a to the rear portion of the vehicle body 2A with the use of the tools placed on the second tool wagon 41. As shown in FIGS. 10A and 11A, the first worker performs the fitting work for fitting the vehicle underbody parts to the front portion of the vehicle body 2A on the first work platform 33, and the second worker performs the fitting work for fitting the vehicle underbody parts to the rear portion of the vehicle body 2A on the second work platform 43. At this time, the SPS carrier 51a is placed in such a position that the longitudinal direction of the SPS carrier 51a is parallel to the right-left direction so that the distance between the SPS carrier 51a and each of the first worker and the second worker is not too long. As a result, the vehicle underbody parts are located near the workers. As shown in FIGS. 10B and 11B, after completion of the fitting works for fitting the vehicle underbody parts to the front portion and the rear portion of the vehicle body 2A, the first worker and the second worker move onto the base 11a to perform the fitting works for fitting the vehicle underbody parts to the center portion of the vehicle body 2A. At this time, the SPS 51a is rotated to such a position that the longitudinal direction of the SPS carrier 51 is parallel to the conveyance direction. As a result, a sufficient workspace is ensured in the right-left direction.

As shown in FIG. 10C, when the fitting works on the vehicle body 2A are completed, the first worker cancels synchronization between the first tool wagon 31 and the base 11a, and moves the first tool wagon 31 to the upstream side (the side from which the vehicle body 2B is moved) through the first conveyance path 30. When the first worker moves the first tool wagon 31 to a position under the front portion of the vehicle body 2B, the first synchronizing portion 31a is engaged with the projection portion of the base 11b so that the first tool wagon 31 is synchronized with the floor friction carrier 10b. The second worker cancels synchronization between the second tool wagon 41 and the base 11a, and moves the second tool wagon 41 to the upstream side through the second conveyance path 40. When the second worker moves the second tool wagon 41 to a position under the rear portion of the vehicle body 2B, the second synchronizing portion 41a is engaged with the projection of the base 11b so that the second tool wagon 41 is synchronized with the floor friction carrier 10b. The first and second workers move to positions under the vehicle body 2B with the SPS carrier 51a left on the base 11a.

The first and second workers who have moved to the positions under the vehicle body 2B start the fitting works on the vehicle body 2A. The first worker is under the front portion of the vehicle body 2B, and fits the vehicle underbody parts placed on the SPS carrier 51b to the front portion of the vehicle body 2B with the use of the tools placed on the first tool wagon 31. The second worker is under the rear portion of the vehicle body 2B, and fits the vehicle underbody parts placed on the second tool wagon 41 to the rear portion of the vehicle body 2B with the use of the tools placed on the second tool wagon 41.

When the fitting works on the vehicle body 2A are completed, the first and second workers move to the positions under the vehicle body 2B together with the first tool wagon 31 and the second tool wagon 41 to perform the fitting works on the vehicle body 2B. In this way, the first and second workers perform the fitting works and move to positions under the next target vehicle body repeatedly.

As described above, the vehicle bodies 2 are supported by the support portions 13 of the floor friction carriers 10 in such a manner that the longitudinal direction of the vehicle bodies 2 is perpendicular to the conveyance direction, and are conveyed in the state where the vehicle bodies 2 are aligned in the conveyance direction in such a manner that the longitudinal direction of the vehicle bodies 2 is perpendicular to the conveyance direction. The conveyance paths 30 and 40 are formed under the vehicle bodies 2, that is, the spaces that connect the spaces under the vehicle bodies 2 to each other in the conveyance direction (lateral direction of the vehicle bodies 2) are formed. Therefore, in order to form the part spaces 50 under the vehicle bodies 2 separately from the conveyance paths, the part space 50 needs to be formed at a position closer to the front of the vehicle body 20 than the conveyance path 40, and closer to the rear of the vehicle body 20 than the conveyance path 30. Usually, the longitudinal length of a vehicle body is set to be obviously longer than the lateral length of the vehicle body. Accordingly, even if the conveyance paths 30 and 40 are formed, it is possible to reliably form the part spaces 50 under the vehicle bodies 2. In the first embodiment of the invention, under each vehicle body 2, the part space 50 is formed between the first conveyance path 30 and the second conveyance path 40, that is, the part space 50 is formed at a position closer to the rear of the vehicle body 2 than the first conveyance path 30, and closer to the front of the vehicle body 2 than the second conveyance path 40. The first tool wagon 31 can move through the first conveyance path 30, and therefore, the first tool wagon 31 can move under the vehicle bodies 2. Thus, the first tool wagon 31 is located under the vehicle body 2 when the fitting works are performed on the vehicle body 2. Also, the second tool wagon 41 can move through the second conveyance path 40, and therefore, the second tool wagon 41 can move under the vehicle bodies 2. Thus, the second tool wagon 41 is located under the vehicle body 2 when the fitting works are performed on the vehicle body 2. Also, it is possible to place the SPS carriers 51 corresponding to the respective vehicle bodies 2 in the part spaces 50 under the vehicle bodies 2, and move the vehicle bodies 2 down the vehicle assembly line 1. Thus, the SPS carriers 51 are located under the corresponding vehicle bodies 2 when the fitting works are performed on the vehicle bodies 2. Therefore, it is possible to minimize the distance between the first worker and the tools on the tool wagon 31 and the vehicle underbody parts on the SPS carrier 51 and the distance between the second worker and the tools on the tool wagon 41 and the vehicle underbody parts on the SPS carrier 51 when the fitting works are performed on the vehicle bodies 2. As a result, it is possible to efficiently perform the works for fitting the vehicle underbody parts to the vehicle bodies 2.

Usually, the longitudinal length of a vehicle body is set to be obviously longer than the lateral length of the vehicle body. Therefore, in the vehicle assembly line, the distance between the adjacent vehicle bodies is shorter when the longitudinal direction of each vehicle body is perpendicular to the conveyance direction than when the longitudinal direction of each vehicle body is parallel to the conveyance direction. In the vehicle assembly line 1 according to the first embodiment of the invention, the vehicle bodies 2 are aligned in such a manner that the longitudinal direction of the vehicle bodies 2 is perpendicular to the conveyance direction. Therefore, the distance between the adjacent vehicle bodies is short. Thus, the workers can move between the adjacent vehicle bodies 2 within a short time and start the works for fitting the vehicle underbody parts to the next target vehicle body 2 within a short time. As a result, it is possible to efficiently perform the works for fitting the vehicle underbody parts to the vehicle bodies 2.

The two conveyance paths 30 and 40 are formed in the vehicle assembly line 1. The first tool wagon 31 is arranged in the first conveyance path 30, and the second tool wagon 41 is arranged in the second conveyance path 40. The first worker who performs the fitting works along the first conveyance path 30 can use the tools placed on the first tool wagon 31, and the second worker who performs the fitting works along the second conveyance path 40 can use the tools placed on the second tool wagon 41. The two workers can use their own tools when fitting the vehicle underbody parts to the vehicle bodies 2. Therefore, it is possible to efficiently perform the process for fitting the vehicle underbody parts to the vehicle bodies 2.

In addition, as described above, the distance between the adjacent vehicle bodies is shorter when the vehicle bodies are aligned in such a manner that the longitudinal direction of the vehicle bodies is perpendicular to the conveyance direction than when the vehicle bodies are aligned in such a manner that the longitudinal direction of the vehicle bodies is parallel to the conveyance direction. Thus, the total length of the alignment of the vehicle bodies along the conveyance direction, that is, the length of the vehicle assembly line is shorter when the vehicle bodies are aligned in such a manner that the longitudinal direction of the vehicle bodies is perpendicular to the conveyance direction than when the vehicle bodies are aligned in such a manner that the longitudinal direction of the vehicle bodies is parallel to the conveyance direction. In the vehicle assembly line 1 according to the first embodiment of the invention, the vehicle bodies 2 are aligned in such a manner that the longitudinal direction of the vehicle bodies 2 is perpendicular to the conveyance direction. Therefore, the length of the vehicle assembly line 1 is short. Also, if the length of the vehicle assembly line is reduced, the incidental equipment, for example, lighting fixture is reduced. As a result, it is possible to bring about a cost advantage. In addition, the work period that is required to set up the vehicle assembly line is shortened. If a predetermined number of vehicle bodies are conveyed through the vehicle assembly line within a predetermined time period, the speed at which the vehicle bodies are conveyed through the vehicle assembly line is reduced as the length of the vehicle assembly line is reduced. Because the length of the vehicle assembly line 1 according to the first embodiment of the invention is short, it is possible to set the speed at which the vehicle bodies 2 are conveyed through the vehicle assembly line 1 to a low speed. Thus, it is possible to smoothly perform the fitting works on the work platforms 33 and 43. As a result, it is possible to improve the work efficiency.

There is an overhead conveyer vehicle assembly line that includes hangers supported by a building beam. In this overhead conveyer vehicle assembly line, the vehicle bodies are placed on the hangers and conveyed. In the overhead conveyer vehicle assembly line, the equipment, including hangers, used to convey the vehicle bodies 2 is hung from the building beam. In contrast, in the vehicle assembly line 1 according to the first embodiment of the invention, the equipment, including the floor friction carriers 10, used to convey the vehicle bodies 2 is placed on the floor. Thus, the vehicle assembly line 1 according to the first embodiment of the invention is set up with simpler works. In addition, it is possible to determine the positions of the equipment on the floor, for example, the tool wagons 31 and 41 more easily. Further, it is possible to set up the vehicle assembly line 1 at a lower cost and within a shorter period.

A vehicle assembly line 1a according to a second embodiment of the invention will be described below. The portions that differ from those in the vehicle assembly line 1 will be described. The same portions as those in the vehicle assembly line 1 will be denoted by the same reference numerals, and the detailed description thereof will not be provided below.

The vehicle underbody parts include heavy parts (e.g. an engine, a front suspension and a rear suspension). In the vehicle assembly line 1a, these heavy parts are fitted to the vehicle bodies 2. Usually, the heavy parts are too heavy for the workers to lift them up under their own power when these heavy parts are fitted to the vehicle body, and are lifted up with the use of tools (lifting tools such as a lifter). The vehicle body has a vehicle compartment space, in which seats, etc. are placed, in its center portion, and spaces, in which the heavy parts are placed, in its front portion and rear portion. The heavy parts are fitted to the front portion and the rear portion of the vehicle body. Therefore, the lifting tools should be placed under the front portion and the rear portion of the vehicle body when the heavy parts are fitted to the vehicle body.

The vehicle assembly line 1a will be described below in detail. In the vehicle assembly line 1a, the rear suspension 3 is fitted to the rear portion of the vehicle body 2.

Figure 12:
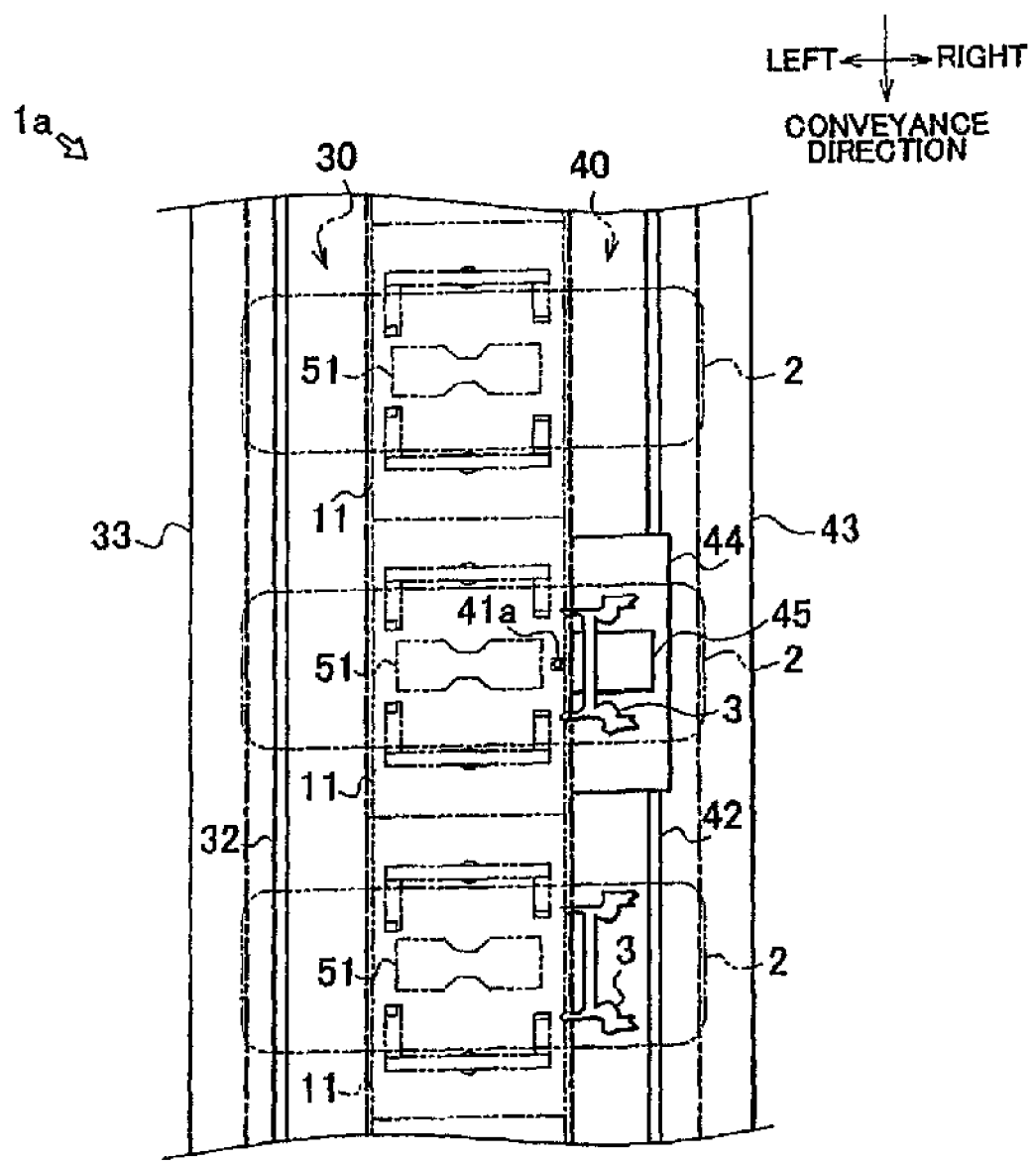
FIG. 12 is a view showing a vehicle assembly line according to a second embodiment of the invention.
Figure 13:
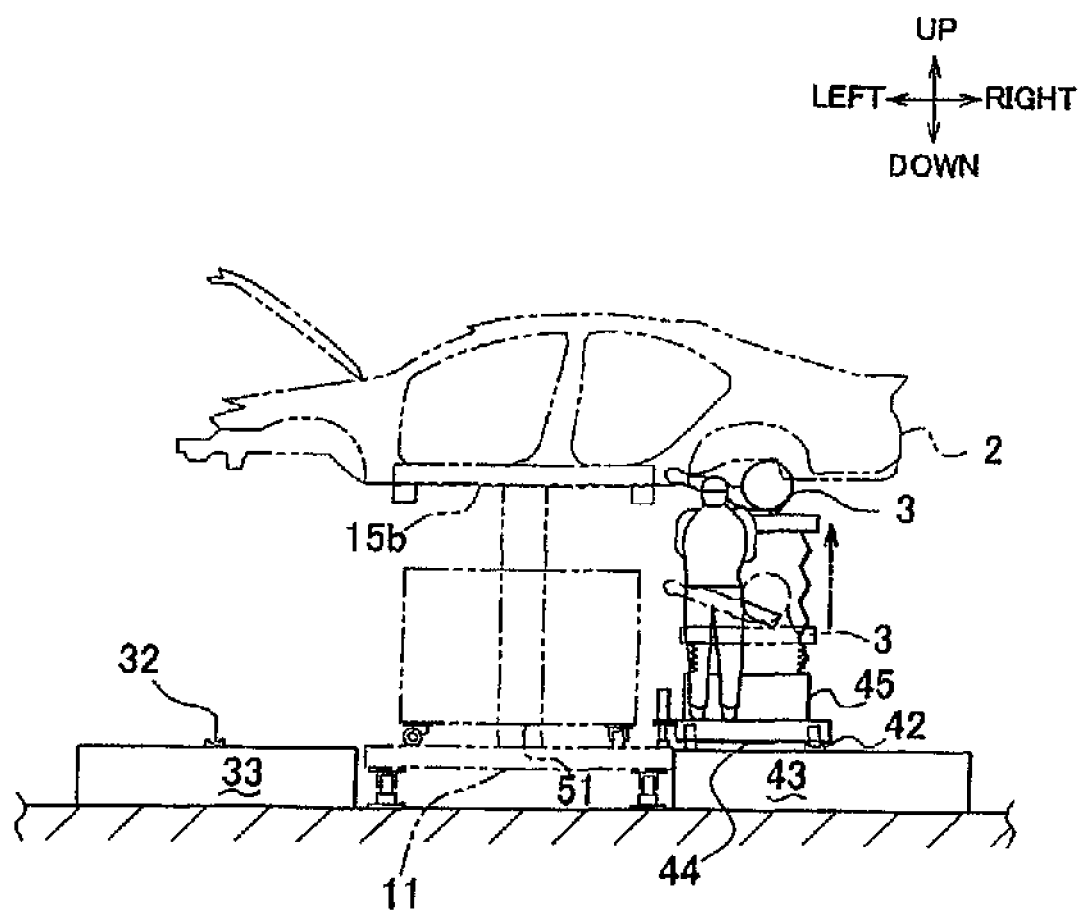
FIG. 13 is a view showing the state where a worker is fitting a rear suspension to a vehicle body with the use of a lifter, viewed in the conveyance direction in FIG. 12.

As shown in FIG. 12, a carrier 44 is arranged in the second conveyance path 40, and the carrier 44 moves on the second rail 42. The carrier 44 is used to convey the lifting tool. The top face of the carrier 44 is a horizontal face, and a lifter 45 used as the lifting tool is placed on the carrier 44. The worker on the carrier 44 can perform the fitting works on the vehicle body 2 with the use of the lifter 45. Two wheels are fitted to each of right and left portions of the bottom face of the carrier 44. The left wheels are fitted to the second rail 42, and move on the second rail 42. The carrier 44 is arranged on the right side of the floor friction carrier 10, and the second synchronizing portion 41a is fitted to the left portion of the carrier 44. The height of the carrier 44 is set to a lowest possible value so that the worker can smoothly move between the carrier 44 and the base 11. The carrier 44 is connected to a control unit (not shown), and moves on the second rail 42 upon reception of a signal from the control unit. The lifter 45 is placed on the top face of the carrier 44, and used to push a rear suspension 3 that will be fitted to the vehicle body 2 from the top face of the carrier 44 up toward the vehicle body 2. For example, as shown in FIG. 13, the lifter 45 has an extensible member that is extensible in the up-down direction. The member (rear suspension 3) placed on the lifter 45 is pushed upward by the operation of the extensible member. The worker under the rear portion of the vehicle body 2 pushes the rear suspension 3 upward with the use of the lifter 45 to fit the rear suspension 3 to the vehicle body 2. In the initial state (stopped state) of the lifter 45, the extensible member is in the contracted state.

The procedures when the fitting works are performed on the vehicle bodies 2 that are conveyed through the vehicle assembly line 1a will be described below. In the following description, the rear suspensions 3 are fitted to the vehicle bodies 2. A rear suspension 3A that is one of the rear suspensions 3 is fitted to the vehicle body 2A, and a rear suspension 3B that is another one of the rear suspensions 3 is fitted to the vehicle body 2B.

Figure 14A:
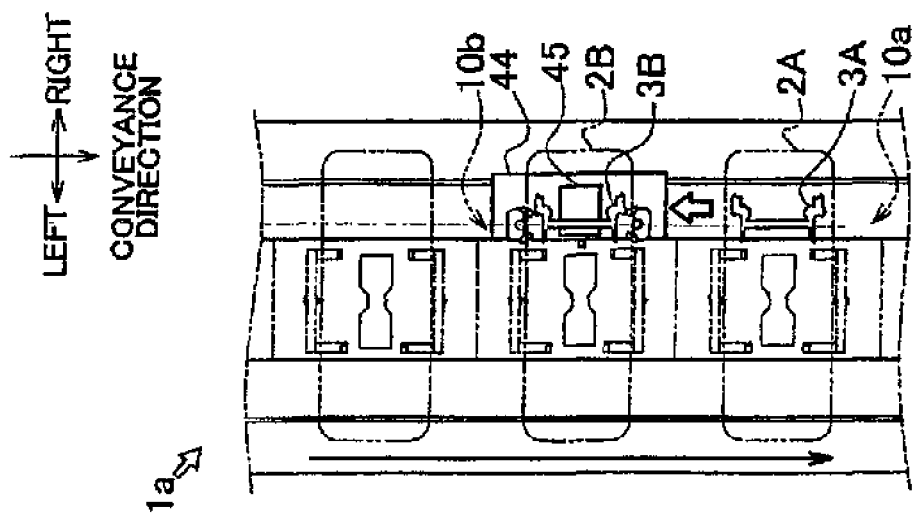
FIGS. 14A to 14C are views showing the procedures when a first worker and a second worker fit the vehicle underbody parts to each vehicle bodies, FIG. 14A showing the state where the first and second workers are fitting the rear suspension to the vehicle body 2A, FIG. 14B showing the state where the first and second workers are fitting a vehicle underbody part other than the rear suspension to the center portion of the vehicle body 2A, and FIG. 2C showing the state where the first and second workers are fitting the rear suspension to the vehicle body 2B.

As shown in FIG. 14A, the first worker and the second worker fit the rear suspension 3A to the vehicle body 2A that is supported by the floor friction carrier 10a. At this time, the carrier 44 is in synchronization with the floor friction carrier 10a, and the carrier 44 (lifter 45) is located under the rear portion of the vehicle body 2A. The rear suspension 3A is placed on the lifter 45, and the first worker and the second worker under the rear portion of the vehicle body 2A (on the carrier 44) fit the rear suspension 3A to the vehicle body 2A with the use of the lifter 45.

Figure 14B:
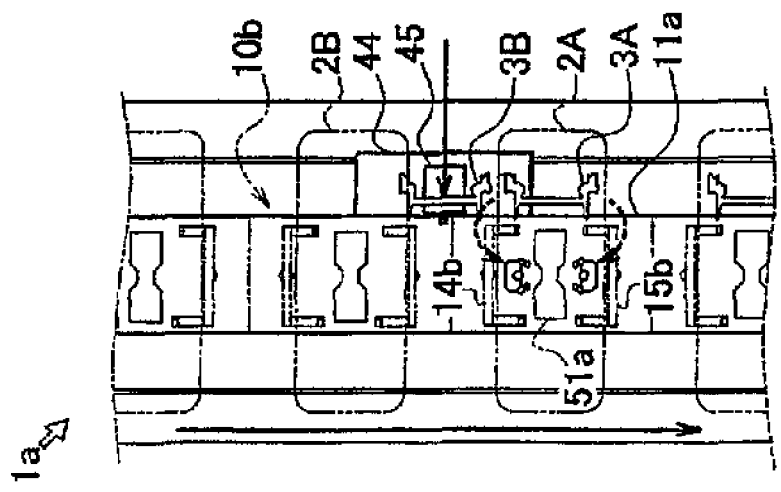

As shown in FIG. 14B, when fitting of the rear suspension 3A to the vehicle body 2A is completed, the first worker and the second worker cancel synchronization between the carrier 44 and the floor friction carrier 10a, move from the positions on the carrier 44 to the positions on the base 11a, and fit the vehicle underbody parts placed on the SPS carrier 51a to the vehicle body 2A on the base 11a. Because the main arms 14b and 15b are arranged at the positions that are higher than the bottom face of the vehicle body 2A and that are the highest possible positions as described above, the first worker and the second worker can smoothly pass under the main arms 14b and 15b to move from the positions on the carrier 44 to the positions on the base 11a (see FIG. 13). If synchronization between the carrier 44 (lifter 45) and the base 11a is cancelled, the carrier 44 is placed in the stopped state. The rear suspension 3B is conveyed and placed onto the lifter 45 in the stopped state. Because the rear suspension 3B is placed on the lifter 45 in the stopped state, it is possible to reliably place the rear suspension 3 on the lifter 45. If the rear suspension 3B is placed on the lifter 45, the control unit moves the carrier 44 toward the upstream side through the second conveyance path 40. When the control unit moves carrier 44 to a position under the rear portion of the vehicle body 2B, the second synchronizing portion 41a is engaged with the projection portion of the base 11b, and the carrier 44 is synchronized with the floor friction carrier 10b.

Figure 14C:
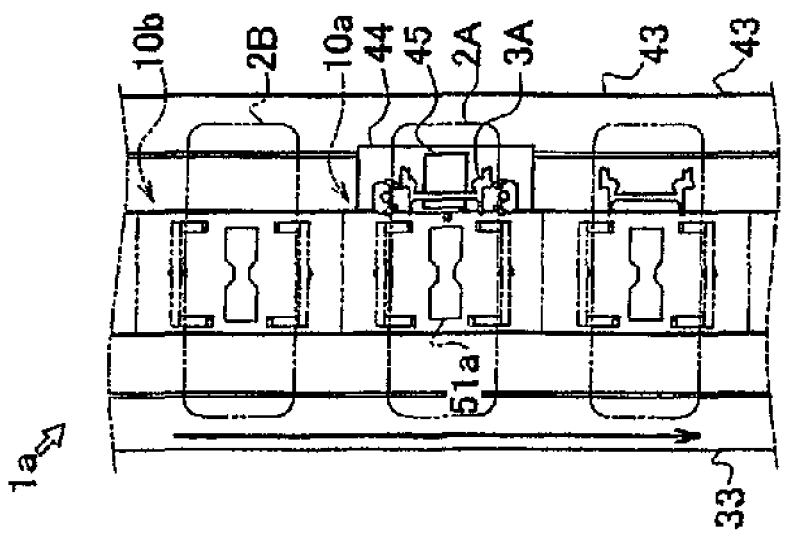
Figure 15A:
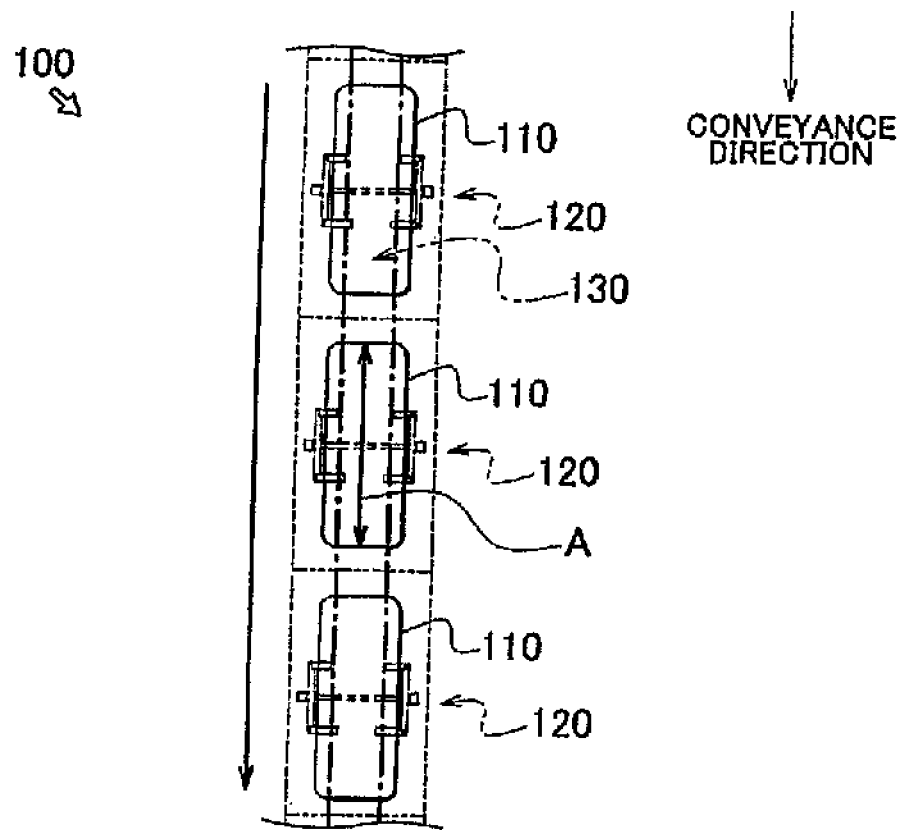
FIGS. 15A and 15B are views showing an existing vehicle assembly line, FIG. 15A showing the virtual state where a conveyance path is formed in the existing vehicle assembly line, and FIG. 15B showing a portion in FIG. 15A viewed in the conveyance direction.
Figure 15B:
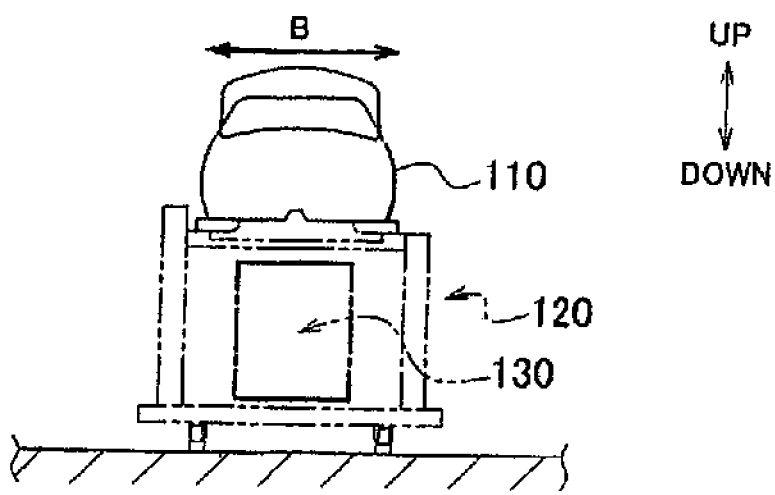

As shown in FIG. 14C, when works for fitting the rear suspension 3A to the vehicle body 2A on the base 11a are completed and the carrier 44 is synchronized with the floor friction carrier 10b, the first worker and the second worker move to positions under the rear portion of the vehicle body 2B and fit the rear suspension 3B to the vehicle body 2B with the use of the lifter 45.

The first worker and the second worker repeat the above-described procedures to sequentially fit the rear suspensions 3 to the vehicle bodies 2 that are conveyed through the vehicle assembly line 1a.

With the structure described above, it is possible to move the lifter 45 to a position under the rear portion of the vehicle body 2 through the second conveyance path 40. Therefore, it is possible to fit the rear suspensions 3 to the vehicle bodies 2, that is, to fit the heavy parts to the rear portions of the vehicle bodies 2. In order to fit the heavy parts (e.g. the engine, the front suspension, etc.), which will be fitted to the front portion of the vehicle body 2, to the vehicle body 2 with the use of the vehicle assembly line 1a, a carrier, a lifter, etc. should be placed in the first conveyance path 30. More specifically, the carrier is placed on the first rail 32, and the lifter is placed on the carrier. Thus, because it is possible to move the lifter to a position under the front portion of the vehicle body 2 through the first conveyance path 30, it is possible to fit the heavy parts, which will be fitted to the front portion of the vehicle body 2, to the vehicle body 2. In addition, the lifting tool (the lifter 45) and the heavy part (the rear suspension 3) are located under the vehicle body 2 when these parts are fitted to the vehicle body 2. As a result, it is possible to efficiently perform the works for fitting the heavy parts to the vehicle body 2.

The heavy tools and parts such as the lifter 45 and the rear suspension 3 are placed on the second work platform 43 instead of on the base 11 of the floor friction carrier 10. Therefore, the floor friction carrier 10 need not have strength and size that are sufficient to support the lifter 45 and the rear suspension 3. As a result, it is possible to downsize the floor friction carrier 10. In addition, the lifting tools such as the lifter 45 need not be placed on the base 11 of the floor friction carrier 10. As a result, it is possible to simplify the structure of the floor friction carrier 10.

The invention claimed is:

1. A vehicle assembly line, comprising:
a plurality of carriers that support respective vehicle bodies to which vehicle underbody parts, which are parts that are fitted to the vehicle bodies from below the vehicle bodies, are fitted, and convey the vehicle bodies along the vehicle assembly line,
wherein the carriers support the vehicle bodies in such a manner that a longitudinal direction of each of the vehicle bodies is perpendicular to a conveyance direction in which the vehicle bodies are conveyed,
wherein there is formed a conveyance path which connects spaces under the vehicle bodies supported by the carriers to each other, and through which a tool used to fit the vehicle underbody parts to the vehicle bodies is conveyed; and
wherein part spaces in which the vehicle underbody parts are arranged are formed separately from the conveyance path, at positions that are under the vehicle bodies supported by the carriers and that are offset from the conveyance path in the longitudinal direction of each of the vehicle bodies.

2. The vehicle assembly line according to claim 1, wherein:
the conveyance path includes a first conveyance path that connects spaces under front portions of the vehicle bodies to each other, and a second conveyance path that connects spaces under rear portions of the vehicle bodies to each other; and
each of the part spaces is formed between the first conveyance path and the second conveyance path.

3. The vehicle assembly line according to claim 1, wherein a tool wagon that is movable in synchronization with each of the carriers is arranged in the conveyance path.

4. The vehicle assembly line according to claim 1, wherein:
the part spaces are formed on the carriers; and
the conveyance path is located next to the carrier in the direction perpendicular to the conveyance direction.

5. The vehicle assembly line according to claim 1, wherein the carriers move on a floor.

6. The vehicle assembly line according to claim 5, wherein:
each of the carriers includes a base of which a top face is a horizontal face, wheels and a vehicle body support portion that supports the vehicle body at a predetermined height; and
a length of the base in the direction perpendicular to the conveyance direction is shorter than a length of a wheelbase of the vehicle body.

7. The vehicle assembly line according to claim 6, wherein:
the vehicle body support portion is formed of an upstream-side support portion and a downstream-side support portion that are arranged with a predetermined distance kept therebetween in the conveyance direction and that are arranged so as to be symmetric with respect to a center line of the base, which extends in the direction perpendicular to the conveyance direction;
vehicle underbody part wagons are placed on the respective bases; and
a longitudinal length of each of the vehicle underbody part wagons is shorter than the length of the base in the direction perpendicular to the conveyance direction, and is shorter than the distance between the upstream-side support portion and the downstream-side support portion.

* * * * *